2 Sheets--Sheet 1.

H. W. SABIN.

Horse Hay-Rakes.

No. 5,242. Reissued Jan. 21, 1873.

Witnesses.
C. F. Brown.
Melville Church

Calista E. Cox
Executrix of
H. W. Sabin.
by Attys.
Hill & Ellsworth

AM. PHOTO-LITHOGRAPHIC CO. N.Y. (OSBORNE'S PROCESS.)

2 Sheets--Sheet 2.

H. W. SABIN.

Horse Hay-Rakes.

No. 5,242. Reissued Jan. 21, 1873.

Witnesses.
C. F. Brown
Melville Church

Calista E. Cox
Executrix of
H. W. Sabin.
By Attys.
Hill Fellsworth

AM. PHOTO-LITHOGRAPHIC CO. N.Y. (OSBORNE'S PROCESS)

UNITED STATES PATENT OFFICE

CALISTA E. COX, OF WEST SOMERSET, NEW YORK, EXECUTRIX OF HARVEY W. SABIN, DECEASED.

IMPROVEMENT IN HORSE HAY-RAKES.

Specification forming part of Letters Patent No. 7,813, dated December 3, 1850; extended seven years, and again extended seven years by act of Congress from June 8, 1872; reissue No. 5,242, dated January 21, 1873.

DIVISION A.

*To all whom it may concern:*

Be it known that HARVEY W. SABIN, late of Canandaigua, in the county of Ontario and State of New York, now deceased, was the inventor of certain new and useful Improvements in Horse Hay-Rakes, for which Letters Patent of the United States were granted him for the term of fourteen years from the 3d day of December, 1850; and that the said patent was duly renewed and extended for the term of seven years from and after the expiration of the first term—to wit, from December 3, 1864—and was again extended by the Commissioner of Patents, by virtue of a special act of Congress, for the further term of seven years from and after the 8th day of June, A. D. 1872; and I, CALISTA E. COX, of West Somerset, in the county of Niagara and State of New York, executrix of the last will and testament of the said HARVEY W. SABIN, deceased, and sole owner of the extended term of said Letters Patent, do hereby declare the following to be a full, clear, and exact description of that part of the invention which effects the discharge of the gathered hay from the teeth of the rake, reference being had to the accompanying drawing and letters of reference marked thereon forming a part of this specification, in which—

Figure 1:
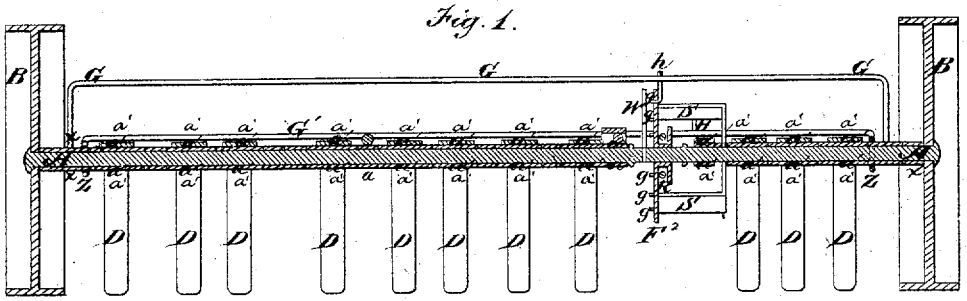
Figure 2:
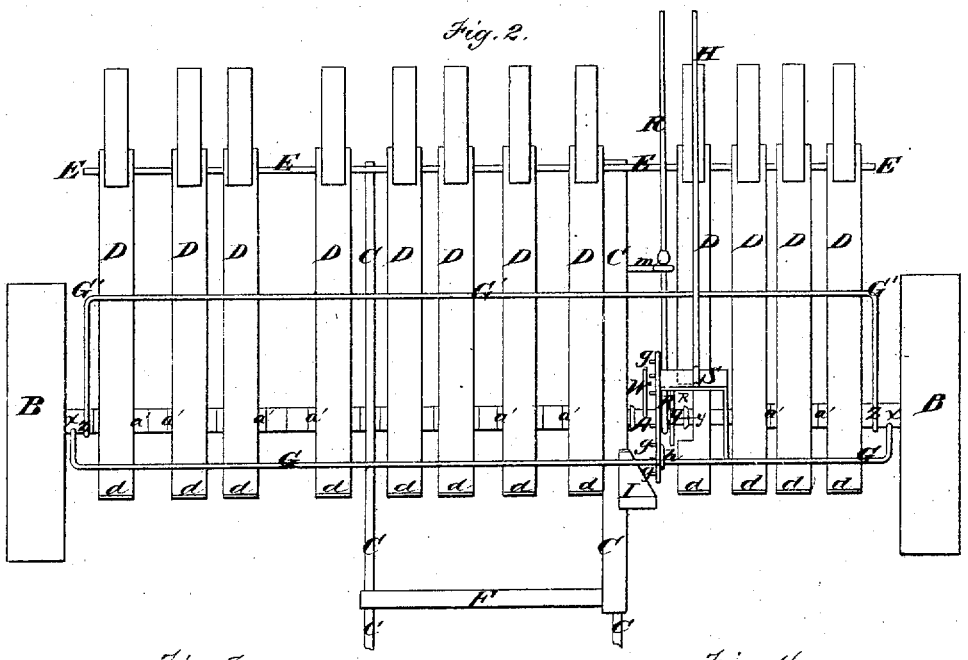
Figure 3:
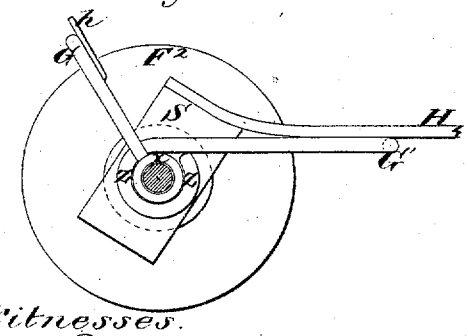
Figure 4:
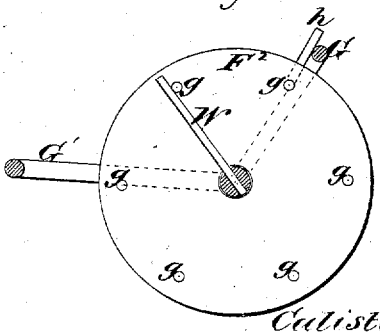
Figure 5:
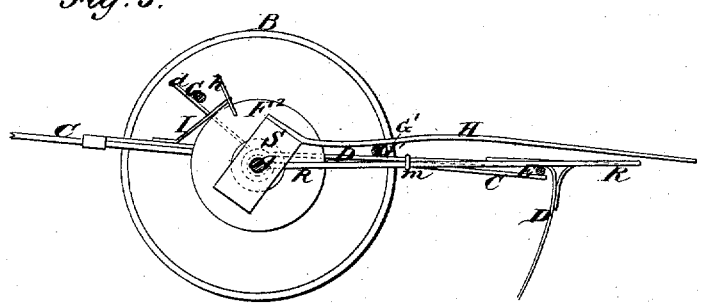
Figure 6:
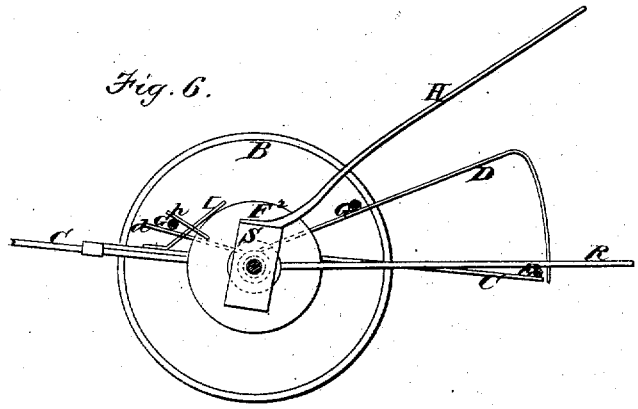
Figure 7:
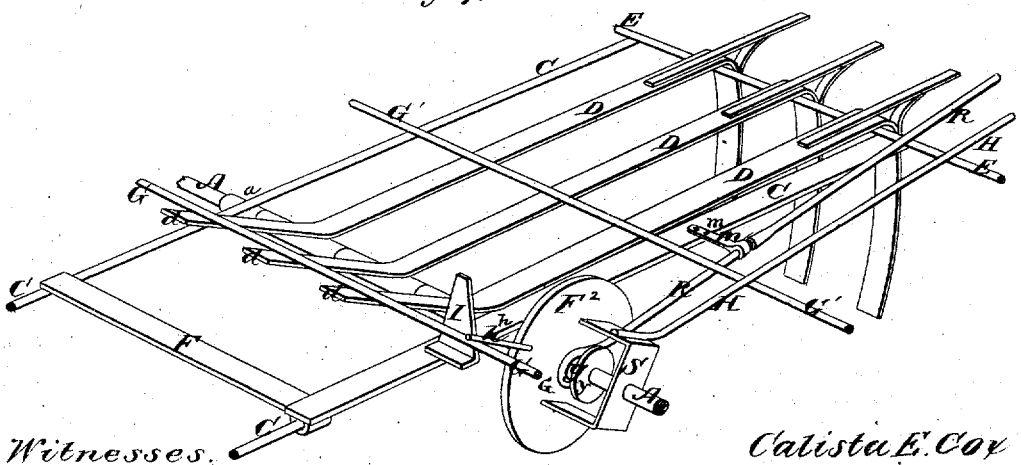

Figure 1 is a vertical transverse section of the rake through the axle of the carriage, looking toward the rear of the rake. Fig. 2 is a plan or top view of the same. Figs. 3 and 4 are detail views of the same. Fig. 5 is a vertical longitudinal section of the rake as it appears when the teeth are in raking position. Fig. 6 is a section similar to Fig. 5 when the teeth are in a discharging position. Fig. 7 is a perspective view of a portion of the rake as it appears when in raking position.

Similar letters of reference in the accompanying drawing denote the same parts.

This invention relates to that class of farming implements commonly known as "horse-rakes," and which are used to gather hay or other like substance in "windrows" upon the field preparatory to cocking the same. The nature of the invention covered by this patent consists in making such horse hay-rakes as do not have their teeth to rotate with their shaft capable of discharging, by the power of the team, the hay which is gathered upon their teeth, such discharge being under the control of the operator. It also consists in making such horse hay-rakes as are suspended or supported and propelled over the field upon rotating wheels both capable of discharging their gathered load upon the ground by the draft of the team, and of automatically resetting themselves to gather fresh loads.

Oscillating horse hay-rakes have not previously to this invention been constructed with a contrivance which enables the driver or manager, at will, to utilize the draft or power of the team to discharge the gathered load of hay upon the ground. Neither have any description of horse hay-rakes mounted upon wheels been capable of both discharging their gathered load of hay by the draft of the team, and of resetting themselves automatically to gather fresh loads.

To enable others skilled in the art to make and use this invention, I will proceed to give a description, with reference to the drawing, of one way in which the same may be done.

In the drawing, A is a rotating axle, and B B wheels for supporting it, one of which is made fast upon the axle, so as to rotate with it. C C are thills or shafts. They are extended back upon and beyond the axle A, and, by means of articulating bearings *a a*, are connected to the same in such a manner that the axle is free to revolve independently of them. On the rear extremities of the thills a transverse bar or rod, E, is arranged, and some distance forward of the axle A a cross-brace, F, is applied to them, so as to keep them apart and afford a means for attaching the single-tree, to which the horse is harnessed. The bar E serves to support all the rake-teeth at a proper raking relation to the ground; and it also serves the office of clearing the gathered hay from the rake-teeth when the rake is elevated for the purpose of discharging its load. D D are rake-teeth, made of springy metal, and of any approved style and shape, and connected to the axle by articulating eye-bearings $a'$ $a'$, which allow the axle freedom to rotate independently of the teeth, except at such times as it may be proper for the axle and teeth to move together. The eye-bearings represented are of tubular form, and much longer than the width of the teeth, and they are slipped upon the axle in such manner that they abut against one another, and thus serve as lateral supports between teeth, which are narrow and are arranged at some distance apart, as represented. These eye-bearings form no part of the invention claimed under this patent, they constituting the subject-matter of another division of this reissue. The teeth extend forward and upward from the eye-bearings $a'$ $a'$, as shown at $d$ $d$, for a purpose presently to be described. This forward extension of the teeth should be on such an angle as will insure the proper elevation of the raking ends of the teeth for clearing the gathered hay therefrom. Upon the axle A is loosely fitted an oscillating disk or wheel, $F^2$, in the face of which a series of pins, $g$ $g$, are set so as to form a circle; and from or near the circumference of the said disk a single lifting-pin, H, extends in a direction at right angles to the pins $g$, as represented. This disk also has a grooved collar, $y$, formed on it, and the same is encircled or clasped by a clutch-lever, R, which is pivoted or fulcrumed at $m$ on one of the thills, and therefrom extended back to a point convenient for the attendant to lay hold of and move it in a horizontal direction whenever it is necessary to couple the rake with the axle. Near and opposite that face of the disk in which the pins $g$ are set a coupling-pin, $w$, projects from the axle so as to stand opposite a space between one or another pair of the pins $g$. Said pin $w$ and the pins $g$ $g$ serve as a means whereby the axle and disk can be geared together, and thus both turn together. To effect this gearing of the axle and disk it is only necessary to lay hold of the clutch-lever R and move it in such a direction as will cause the disk to slide on the axle toward the pin $w$, this movement bringing one or another pair of the pins $g$ in such a position with respect to the pin $w$ that said pin $w$ will stand between them; and, therefore, when the axle is moved it carries the disk with it. G represents what may be termed a tilting-frame, and G′ a pressure-frame. The front frame G is jointed loosely on the axle A, near the wheels B B by means of tubular boxes or sleeves $x$ $x$, to which it is rigidly fastened, while the rear frame G′ is loosely jointed upon said sleeves or boxes $x$ $x$ by means of coils $z$ $z$ on the terminus of its side bars. Thus attached or connected to the axle A the frame G is free to turn or oscillate independently of the axle and of the frame G′, while the frame G′ is free to oscillate independently of both the axle and the frame G. The respective frames G G′ consist of a transverse bar, which is nearly as long as the axle A, and two side bars, which run at right angles to the transverse portion and connect to the oscillating sleeves or boxes in the manner above described and herein represented. The transverse bar of the front frame G rests against the upper side of the forward extensions of the teeth, while the transverse bar of the rear frame G′ rests down upon the teeth in the rear of the axle A.

It will be observed that the side bars of the rear frame G′ are longer than the side bars of the front frame G, and by reason of this the rear frame G has the superior weight, which, in connection with the weight of the rear part of the teeth, insures a return of the parts to a raking position after a gathered load has been discharged upon the ground.

The frame G is allowed to articulate upon the axle, in order that the tripping-pin $h$ may move it around against the forward extensions of the teeth, and the frame G′ is allowed to articulate on the sleeves or boxes of the frame G, in order that it may turn and rise when it is necessary that one rake-tooth shall rise independently of the others. Were it not for this independent articulation of the frame G′ the teeth could not be elevated separately, but they would be raised simultaneously, for any upward movement of the frame G′, if fastened rigidly to the sleeves or boxes, would be imparted to the sleeves or boxes, and from them to the frame G, and of course to the rake-teeth.

H is a hand-lever, fastened to an open hub, S, of the oscillating disk. This lever extends to a convenient point over the transverse bar of the frame G′, to be controlled by the attendant of the machine. By means of this lever the attendant can, when necessary, exert any required pressure upon the transverse bar of the frame G, and thus keep all of the metallic spring-teeth to their work; or with it all of the teeth, when necessary to clear formidable obstructions, may be thrown up and again be brought back to their raking position; for, by moving the lever upward, the disk will be turned and the lifting-pin made to press against the front tilting-frame G, and said frame thereby made to elevate the raking ends of the teeth. To elevate the teeth by hand it is not necessary to couple the disk with the axle. I is an inclined trip, attached to one of the thills in such relation to the lifting-pin $h$ of the oscillating disk that after the disk has been set in gear with the axle, and the rake is being elevated and its load discharged by the draft of the team, the said lifting-pin will come in contact with it and at the proper moment cause the disk to slide laterally on the axle and release its pins $g$ from the coupling-pin $w$, and thus allow the oscillating frames G G′, with the disk, rake-teeth, and hand-lever, to go back or reset themselves in their original positions, ready for gathering a fresh load. The length of the pins $g$ and the form of the trip I are such that the pin $h$ will be tripped when the rake-teeth have risen high enough to have the hay cleared from them by the rod or bar E.

The pressure contrivance, in connection with spring-teeth, applied so as to be under the control of the operator, and for applying or producing the pressure upon the rake-teeth, constitutes the subject-matter for another division of this reissue; and, therefore, no claim is made in this patent on the same.

There are also other features of invention herein described upon which the invention herein claimed does not depend for its successful operation, and upon such features of invention separate divisions or patents are applied for simultaneously with this.

Although I have given a general idea of the operation of the rake shown, it may be stated further that as soon as the rake-teeth have collected a load of hay the attendant takes hold of the lever R and with it moves the clutch-disk $F^2$ in gear with the coupling-pin *w* of the axle. This done, and the axle being in motion from the draft of the team and the traction of the driving-wheels, the axle and disk turn together, and the pin *h*, bearing against the front tilting-frame G, will depress the forward ends of the rake-teeth and cause the rear parts thereof with the lever H, and the rear oscillating pressure-frame G′, to rise to a proper position for the discharge of the gathered load of hay. About the moment of the discharge of the hay upon the ground the lifting-pin *h* becomes a releasing-pin by striking the incline trip I, and is with the disk slipped out of gear with the axle; at this stage the superior weight of the rear part of the rake over that of the forward part causes an instantaneous resetting of the whole for the gathering of a fresh load of hay.

Having described one practical mechanical contrivance for carrying out the invention herein described, I will state that I do not limit myself to the particular construction and arrangement of devices shown and described, as it is obvious that the invention might be embodied in different forms without departing from the principle involved.

What I claim, and desire to secure by Letters Patent, is—

1. An oscillating horse hay-rake which discharges its gathered load at the will of the operator by the draft or power of the team, substantially as described.

2. A wheeled horse hay-rake, both capable of discharging its gathered load upon the ground by the draft of the team and automatically resetting itself to gather a fresh load, substantially as described.

3. An oscillating horse-rake, the teeth of which do not rotate with their shaft, so constructed that its teeth may either be elevated by the draft of the team or by the attendant, substantially as described.

CALISTA E. COX,
*Executrix.*

Witnesses:
REUBEN TENNY,
JOHN R. JESSON.